Jan. 8, 1929.　　　　　　　　　　　　　　1,698,277
A. G. RONNING ET AL
TRACTOR TRUCK
Filed June 3, 1924　　　　2 Sheets-Sheet 1
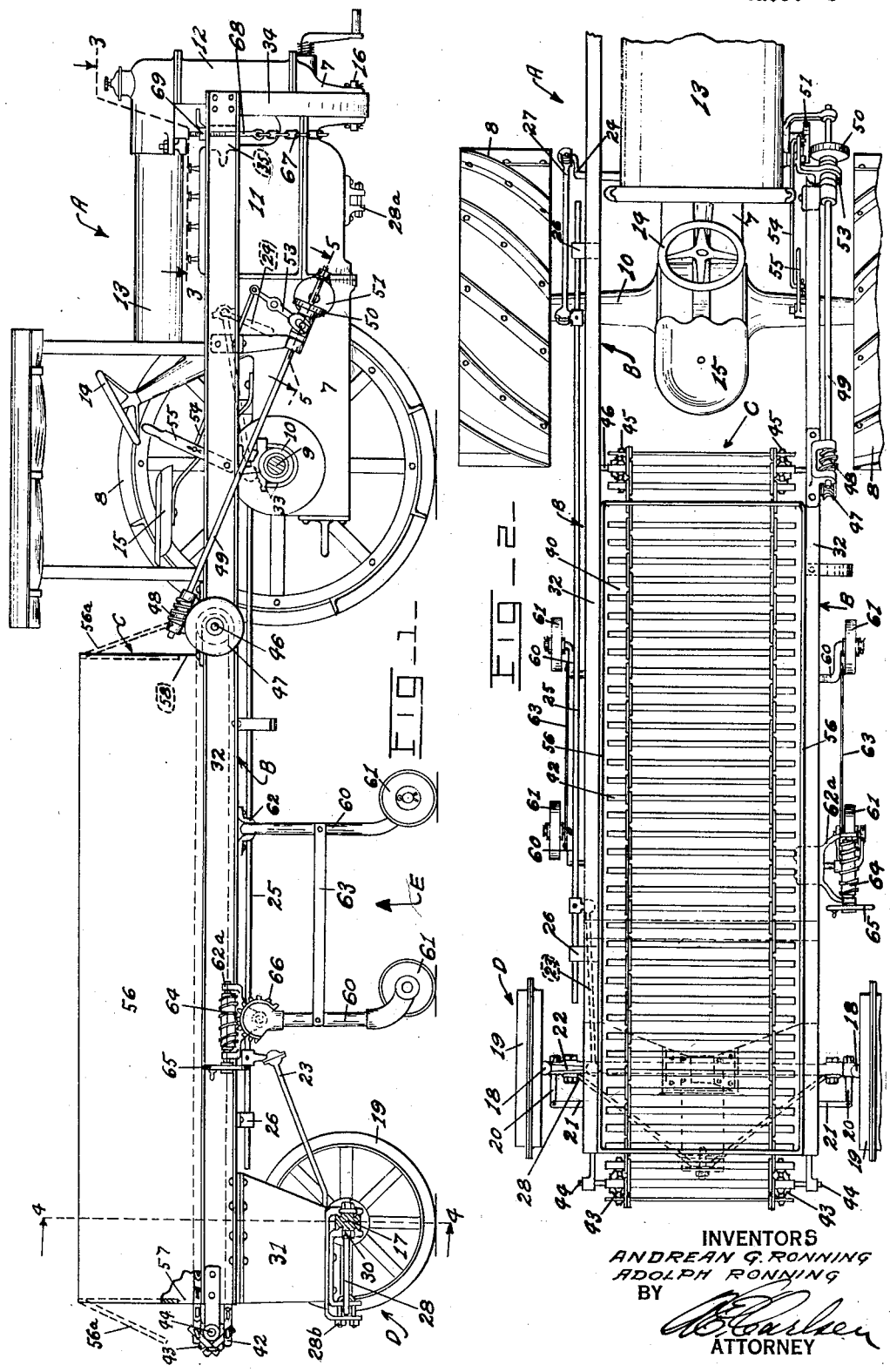
INVENTORS
ANDREAN G. RONNING
ADOLPH RONNING
BY
ATTORNEY Jan. 8, 1929.
A. G. RONNING ET AL
1,698,277
TRACTOR TRUCK
Filed June 3, 1924
2 Sheets-Sheet 2
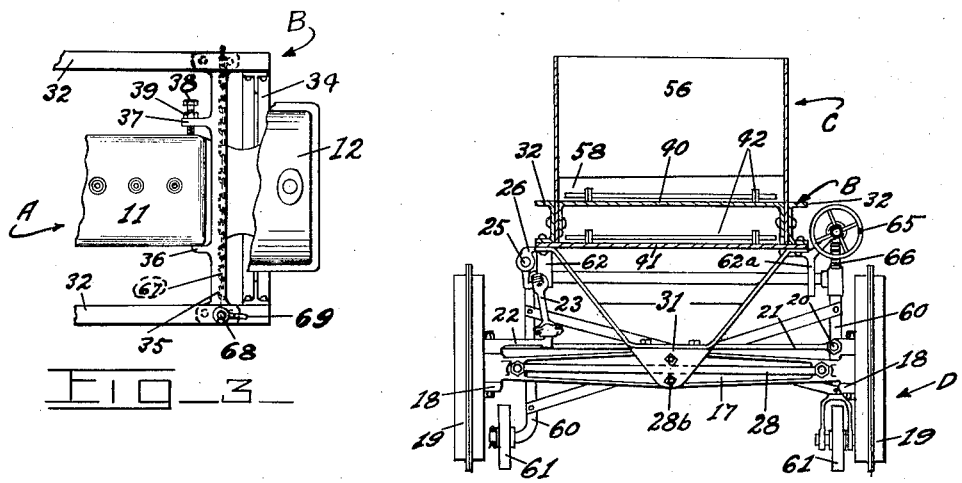
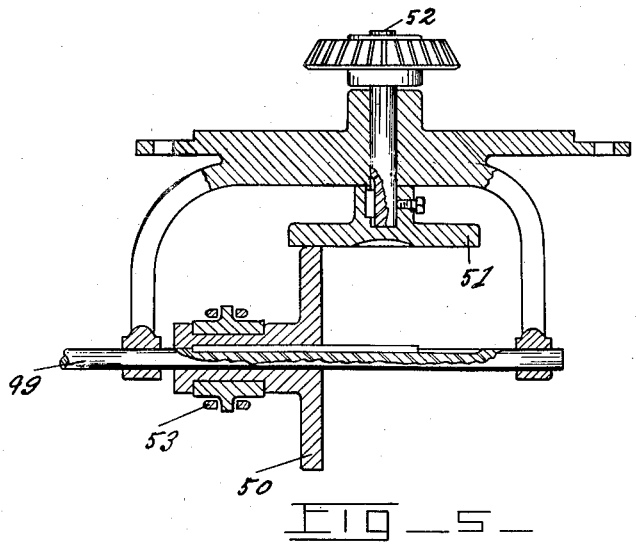
INVENTOR
ANDREAN G. RONNING
ADOLPH RONNING
BY
ATTORNEY Patented Jan. 8, 1929.

1,698,277

UNITED STATES PATENT OFFICE.

ANDREAN G. RONNING AND ADOLPH RONNING, OF MINNEAPOLIS, MINNESOTA; JACOB A. RONNING AND ADOLPH RONNING EXECUTORS OF SAID ANDREAN G. RONNING, DECEASED.

TRACTOR TRUCK.

Application filed June 3, 1924. Serial No. 717,511.

This invention relates broadly to tractors, and the main object is to provide as an attachment thereto an auxiliary frame apparatus, whereby such tractor may be converted into industrial purposes such as trucking, and whereby certain of the tractor elements may be detached and reapplied to the auxiliary mechanism, so as to perform similar functions but under varied circumstances and in a different yet analogous manner. The arrangement of parts herein disclosed may be considered, largely by contrast, with the structure having somewhat similar objects, as disclosed in our application for patent Serial No. 451,746, which was filed on March 12th, 1921. The present disclosure is also common in some respects to the subject matter to which our copending application Serial No. 726,662, is also directed. More especially, we wish to submit our present invention as an auxiliary frame structure (for tractors of the well known Fordson or similar type), in which the frame extends rearwardly of the tractor member and has its rear end supported by the steering truck, which has been detached from its normal position on the tractor; and then supporting the front end of the tractor by the auxiliary frame, with a result that the entire structure is supported by the original wheels, the positions of which are reversed so that as the machine moves forward the steering will be effected by the rear wheels. One of the objects of extending the auxiliary frame to a considerable extent rearwardly of the tractor unit proper is to provide means for carrying or supporting a hayrack, wagon box or a working implement, such as a grader, a scraper, an excavator, or for farm implements such as plows or harvesting machinery. Such attachments are illustrated in the applications above mentioned and are therefore not here shown, as, aside from the frame structure and wheel arrangement the present invention has more particular reference to a load handling apparatus located upon the rear portion of the frame.

With reference to the accompanying drawings:

Fig. 1 is a side elevation of a structure embodying our invention, the near ground wheels being removed.

Fig. 2 is a top or plan view of the structure shown in Fig. 1, a portion of the front end being broken away.

Fig. 3 is a fragmentary detail view as seen on the line 3—3 in Fig. 1.

Fig. 4 is a sectional elevation as seen on the line 4—4 in Fig. 1.

Fig. 5 is an enlarged detail section as seen about as on the line 5—5 in Fig. 1.

Referring to the drawings more particularly and by reference characters, A refers in a general manner to the tractor element, B to the auxiliary frame, C to the load carrying apparatus, and D to the steering truck or normal fore carriage of the tractor. The tractor unit shown is that of the well known Fordson type, comprising a body member 7, traction wheels 8, a rear axle 9, axle housing 10, engine 11, radiator 12, fuel tank 13, steering wheel 14, and a driver's support or seat 15. The steering truck D, which is ordinarily pivoted to the front end of the tractor by the pin 16 (Fig. 1) consists of an axle 17 to the ends of which are secured by the customary spindle members 18, the steering wheels 19, which are simultaneously turned by the arms 20, connected by the rod 21. One of the spindle members also has a second arm 22 actuated by the usual steering gear connecting rod 23. When the truck D is in its original position on the tractor the socket at the upper end of the rod 23 connects with a crank 24, or one similar to it, controlled by the hand wheel 14. When the truck D is used in the new arrangement, however, the rod 23 is extended forwardly, and is actuated by the crank 24 through the medium of an extension rod 25, which is slidably secured to the frame B by brackets 26; and a connecting rod 27, as shown in Fig. 2. The crank 24 normally depends from its swinging center, but is here reversed to an upward position, as indicated in Fig. 1, so that when the hand wheel is turned, for instance to the right, the steering wheels 19 will be angled to the left, and as the entire machine then moves forward, it will consequently be steered to the right. The numeral 28 designates the usual radius or tie rods, of the axle 17, which were previously secured to the bracket fingers 28ª of the engine, but are now secured as at 28ᵇ to a rearward extension of a bolster frame 31. The axle 17, as is shown, is pivotally secured, as at 30, to the bolster 31 which supports the rear end of the auxiliary frame B with which it is rigid. It will thus be seen that all the parts of the truck D, with the exception of the connecting rod 23 which is merely reversed on the crank (22) ball, assume their identical relative positions thus rendering the shifting of the truck from front to back a very easy matter.

The frame B proper, consists essentially of a pair of long channel bars 32 which are primarily supported and detachably secured upon the axle housing 10, by suitable securing means 33. The rear end of the frame is supported by the truck D which has been removed from the front end of the tractor, and the front end of the tractor is supported at its normal elevation by a U-shaped depending yoke 34, which connects the bars 32, and is provided with an aperture to receive the (axle) pin 16, thus securely arranging the tractor in the auxiliary frame. As additional means for securing the tractor in the frame, and to steady one with respect to the other and prevent torsional strain or twisting action by reason of the single front bearing 16, we provide the frame B with a rigid cross arm 35, immediately forward of the engine block 11. This arm (see Fig. 3) is provided with a pair of integral fingers 36 and 37, the latter of which has a set screw 38 having a lock nut 39, with a result that the engine and the entire body of the tractor are easily and quickly rendered very rigid with the auxiliary frame.

The rear end portion of the frame bars 32 are connected by the bolster 31, the brace 29, and by an upper floor member 40 and a lower floor 41 spaced therebelow. An apron or endless carrier 42 is arranged to travel with its upper and lower runs on the respective floors 40 and 41. This apron engages over sprockets 43 on a shaft 44, at the rear end of the frame B, while the forward end of the apron engages over and is driven by the sprockets 45 on a shaft 46. One end of the shaft 46 is provided with a worm gear 47 driven by a worm 48 on a shaft 49. The forward end of the shaft 49 is provided with a clutch wheel 50 which is slidably keyed on the shaft, as shown in Fig. 5. The wheel 50 frictionally engages with a disk 51 which has been substituted for the usual power pulley on the power shaft 52. The position of the wheel 50 is regulated by a forked lever 53 controlled through a rod 54 by a hand lever 55. The wheel 50 has a range of movement to both sides of the center of the disk 51, with a result that by manipulating the hand lever 55 the operator can readily control the speed and direction of the conveyor 42, and when no movement of the conveyor is desired, it is of course only necessary to shift the wheel 50 to the center of the disk 51 so that the latter will not rotate the former.

Superimposed upon the rear part of the frame B, and over the upper run of the conveyor 42 is a container or box 56, the end walls of which are provided with openings or slots 57 and 58 through which the upper run of the conveyor 42 travels. The box, when used merely as such, is of course adapted to carry anything desired to be hauled. Thus it may be convenient for receiving and carrying corn ensilage, grain, potatoes or other farm products which are taken from the ground or growing condition by harvesting machinery which is drawn along near or attached to the frame B. The addition of the carrier apron 42 and its driving connection with the power shaft 52 of the tractor renders the structure capable of unloading the material carried in the box. Such material may be unloaded by actuating the upper run of the conveyor rearwardly, as in a manure spreader. Or, by shifting the hand lever 55 so that the wheel 50 will contact with the opposite side of the disk 51, the apron 42 will move rearwardly so as to feed the load out through the opening 58. The ends of the box may consist of detachable or hinged end gates, as indicated by the dotted lines 56ª in Fig. 1 to facilitate the unloading operation. The construction thus permitting this reversing feed is particularly desirable in road work, where, as shown in our co-pending application Serial No. 726,662, a grader or other road machine is suspended under the frame B. In that event it will be seen that the present construction will permit sand, crushed rock or other road surfacing material to be laid on the road either in front or in back of the implement while the same is being moved over the road, which, of course, under various circumstances is highly desirable. It may here be noted that although the load in the box 56 is carried largely by the steering truck D, its weight is partly counter-balanced by the tractor unit portion which is carried by the front end of the auxiliary frame, which frame by thus bearing more heavily down on its fulcrum, the axle of the traction wheel, increases the traction resistance those wheels will have with respect to the ground, and this is obviously very favorable to the heavier duty the tractor is being called upon to perform. And, by the same token, it will be seen that the weight upon the truck D will be correspondingly reduced, making the steering operation easier, although the effort required to angle steering wheels which are pulled, as in the present instance, is not near as great as that required to steer wheels which are being pushed as in the ordinary motor vehicle. Any difficulties which may arise with respect to traction, steering or load centers can obviously be overcome by properly proportioning the length of the rear end of the auxiliary frame, or by forward or rearward adjustment of the load box, and steering truck bolster.

Means are also provided and will now be described for facilitating the process by which the transformation of the various elements to their respective positions is effected, as it is obvious, for instance, that the front end of the tractor must be supported while the truck D is being removed and the yoke 34 applied and for supporting the auxiliary frame while it is being attached to the tractor and the truck D in turn applied to the bolster 31.

An adjustable supporting truck E is secured to the frame B approximately under its load center so that it may support the frame when the latter is disconnected from the tractor A and truck D. This truck E consists of a pair of inverted U-shaped bars 60 having rollers or small wheels 61 at their lower ends. These U-bars are journaled to the frame B by brackets 62, and are connected by link bars 63 so that they may be simultaneously operated. One of these brackets 62ª also journals a worm 64 controlled by a hand wheel 65, which worm meshes with a worm wheel or gear 66 on one of the members 60. Thus when the hand member 65 is rotated the wheels 61 will be raised or lowered, as desired.

The members 34 and 35 at the front end of the frame B are fastened thereto by suitable means such as bolts, so that these members 34 and 35 may be removed from the frame when the latter is being moved forwardly into place on the tractor. When this has been done we provide a temporary lifting device in the form of a chain 67 and a bolt 68 having a tightening member 69, which chain passes between the bars 32 and under the engine, so that the latter will be supported as the truck D is being removed. When the truck D has been removed (and applied to the rearward position) the members 34 and 35 can be bolted into place and then, when the wheels 61 have been raised off the ground the machine is in readiness for action.

Having now illustrated and described our invention to the extent that the general principles and some of the details of construction may be readily understood to those who are skilled in the art, what we claim is:

1. The combination with a tractor having rear traction wheels and having its steering truck removed from its normal forward position to a rearward position with respect to the traction wheels, which traction wheels are retained in their normal position on the tractor of an auxiliary frame extending rearwardly from the tractor and supported at said rear end by the steering truck, and having its forward end extended to support the forward end of the tractor, means at an intermediate part of the frame to support the same over and to the rear axle housing of the tractor, and means for angling the wheels of the steering truck.

2. The combination with a normal tractor having its steering truck removed from the front end thereof but in which the traction wheels are retained in their normal rearward position, of a frame secured in alignment to the tractor and extending far rearwardly thereof, said frame having means to support the forward end of the tractor from which the steering truck has been removed, said steering truck being applied to the rear end of the frame, and means to angle the wheels of the steering truck to steer the machine.

3. The combination with a normal tractor having traction wheels at its rear end, of a frame having side rails superimposed upon the tractor and extending rearwardly therefrom so as to counterbalance the tractor with the axes of said rear traction wheels as the fulcrum, a yoke connecting the front ends of said rails and arranged to be substituted for the steering carriage of the tractor to support the front end of the tractor, said steering carriage being applied to the rear end of the frame to support and steer the same.

4. The combination with a tractor having its normal forecarriage removed but in which the traction wheels are retained in their normal rearward positions, of an auxiliary frame secured to the tractor and extending rearwardly therefrom, the fore carriage of the tractor being applied to the rear end of the auxiliary frame, a container supported by said frame rearwardly of the tractor and substantially in advance of the fore carriage, and means operatively connected to the power member of the tractor, for unloading said container while the entire machine is traveling over the ground.

In testimony whereof we affix our signatures.

ANDREAN G. RONNING.
ADOLPH RONNING.